United States Patent
Jones et al.

(10) Patent No.: US 6,542,825 B2
(45) Date of Patent: Apr. 1, 2003

(54) REAL-TIME SITE SPECIFIC WEATHER INFORMATION DISTRIBUTION SYSTEM AND METHOD

(75) Inventors: Erick C. Jones, Huntsville, AL (US); Tony L. Benson, Huntsville, AL (US); Robert O. Baron, Sr., Huntsville, AL (US); Thomas S. Thompson, Athens, AL (US)

(73) Assignee: Baron Services, Inc., Huntsville, AL (US)

( * ) Notice: Subject to any disclaimer, the term of this patent is extended or adjusted under 35 U.S.C. 154(b) by 57 days.

(21) Appl. No.: 09/815,634

(22) Filed: Mar. 23, 2001

(65) Prior Publication Data

US 2001/0049584 A1 Dec. 6, 2001

Related U.S. Application Data

(60) Provisional application No. 60/192,114, filed on Mar. 24, 2000.

(51) Int. Cl.$^7$ .............................................. G06F 169/00
(52) U.S. Cl. ......................................................... 702/3
(58) Field of Search ....................... 702/3, 4, 5; 342/26; 340/601

(56) References Cited

U.S. PATENT DOCUMENTS

| | | | |
|---|---|---|---|
| 4,521,857 A | | 6/1985 | Reynolds |
| 5,023,934 A | | 6/1991 | Wheeless |
| 5,517,193 A | | 5/1996 | Allison et al. |
| 5,568,385 A | | 10/1996 | Shelton |
| 5,628,050 A | * | 5/1997 | McGraw et al. .............. 340/7.5 |
| 5,699,245 A | * | 12/1997 | Herold ........................... 702/4 |
| 5,717,589 A | | 2/1998 | Thompson et al. |
| 5,910,763 A | | 6/1999 | Flanagan |
| 6,018,699 A | | 1/2000 | Baron, Sr. et al. |
| 6,028,514 A | * | 2/2000 | Lemelson et al. ........... 128/903 |
| 6,076,044 A | * | 6/2000 | Brown .......................... 702/3 |
| 6,084,510 A | * | 7/2000 | Lemelson et al. ........... 340/539 |
| 6,104,582 A | | 8/2000 | Cannon et al. |
| 6,125,328 A | | 9/2000 | Baron et al. |
| 6,188,960 B1 | | 2/2001 | Baron et al. |

* cited by examiner

Primary Examiner—Donald E. McElheny, Jr.
(74) Attorney, Agent, or Firm—Lanier Ford Shaver & Payne P.C.; Do Te Kim

(57) ABSTRACT

A system for providing real-time site specific weather information includes a plurality of remote sensing units, each of which incorporates an electronic messaging system for delivering electronic messages indicative of ground level meteorological observations, and a server system communicating with the remote sensing units to receive the electronic messages. The server system includes a database for storing information pertaining to the remote sensing units and instructions for routing the received electronic messages. At least one remote system is configured to receive non-ground level meteorological data indicative of a weather phenomenon and to associate the electronic messages with the non-ground level meteorological data for graphical display together with a graphical view of the geographic area affected by the weather phenomenon and the ground level meteorological observations. A method for providing real-time site specific weather information is also disclosed.

11 Claims, 7 Drawing Sheets

REAL-TIME SITE SPECIFIC WEATHER INFORMATION DISTRIBUTION SYSTEM AND METHOD

CROSS REFERENCE TO RELATED APPLICATIONS

This application claims the benefit of U.S. Provisional Application No. 60/192,114, filed Mar. 24, 2000, which is hereby incorporated by reference herein.

BACKGROUND OF INVENTION

1. Field of Invention

The present invention relates generally to the field of weather data distribution systems and methods, and more particularly to a system and method for distributing weather related electronic communications between remote sensing units, broadcasters, and others having systems configured to receive such electronic communications in order to provide a substantially complete picture of meteorological events occurring at a particular geographic location in real-time.

While the present invention is subject to a wide range of information dissemination applications, it is particularly well suited for the distribution of observed meteorological events obtained by ground based sensing unites to broadcasters and others, over a computer based network. The weather related electronic communications may then be combined with weather information obtained from radar and/or other sources to provide an integrated and interactive graphical display of the received weather information and observed meteorological events for a given geographical area.

2. Technical Background

In today's weather reporting and forecasting fields, an ever increasing importance is being placed on timeliness and accuracy of the information being broadcast or otherwise reported. A large percentage of the population of the United States relies upon weather reports and forecasts broadcast by both local and national television stations and Emergency Management Agencies (EMAs) to accurately relay current weather conditions, and to make predictions relating to future weather conditions for that portion of the population's particular geographic area as well as other geographic areas of interest. This information is generally used by individuals to make decisions such as what to wear, whether they should participate in certain activities or not, when they should embark on a trip, when they should seek shelter, etc. When severe weather threatens a particular geographic area, a majority of the population made aware of the severe weather for that particular geographic area has an immediate desire to find out as much information as possible about the severe weather. Weather events such as tornadoes, severe thunderstorms, hail, lightning, and high winds present a risk of damage to property, injury to persons, and in some cases death. For these reasons, it benefits individuals to determine if they are likely to be affected by such severe weather. If they are, they can seek shelter, or otherwise take cover to protect themselves from these events. Accordingly, it is important that the information viewers receive is timely and accurate.

During the last two decades, significant strides have been made in this regard. The National Weather Service (NWS) now maintains a network of weather radar installations located at approximately one-hundred and thirty-eight sites throughout the United States. Observers at each of these installations monitor the weather conditions for their respective geographic areas of radar coverage, and provide periodic reports such as teletyped messages and more recently, information known generally in the art as NEXRAD attributes, to subscribers. Generally speaking, this information is distributed to subscribers through third party weather service providers such as GTE Contel. Other weather service providers, such as Global Atmospherics in Arizona, provide information such as lightning strike data on a subscription basis. In addition, many local television stations now own or lease their own weather radar systems. This technology gives these stations the ability to broadcast real-time weather information for the benefit of the portion of the public in the viewing areas of these station.

The weather information provided by any one or combination of services discussed above may be synthesized at a local television station or a third party provider into a understandable format for graphical display, or other form of dissemination, to the public. Typically, the meteorological data is collected from one or more sources at the local television station and combined with geographic image maps of a predetermined geographic region to generate a graphic display of the weather conditions for that predetermined geographic region. The composite weather images can be stored over time, sequenced, and looped with the aid of a computer system so that the television stations and other broadcast mediums can deliver weather animation that simulates the movement of the weather system across the geographic region over a period of time. Technology has also advanced such that television stations and Internet providers can now operate computer systems that actually predict storm movement and other weather system movement, and forecast that movement for some time into the future. Such systems are generally known in the art as storm tracking systems.

Remote sensing devices used to provide weather information/data for broadcast and other purposes as described above, such as the NWS weather radars and locally owned weather radars, do have limitations. Weather radar systems in operation today generally provide atmospheric information for a volume of air that can extend from a few hundred feet above the ground to the top of the atmosphere. Thus, when radar information is processed and synthesized for a particular weather phenomenon such as a storm, and is thereafter graphically displayed in a video broadcast or otherwise, what a viewer sees is a graphical depiction of that weather phenomenon or storm at those elevations. The radar information does not provide data relating to what is actually occurring meteorologically at ground level beneath that weather phenomenon. As a result, it is quite often the case that viewers see a storm associated with their geographic location when viewing a television or other weather broadcast, which indicates to the viewer that rain, hail, snow, ice, severe winds, or some other weather phenomenon should be occurring at their location, but in fact, no such event is occurring. Generally, when this happens the viewer believes he has received a bad or faulty forecast. In reality, the forecast is generally accurate, but it is accurate for what is occurring several hundred feet above the viewer, not on the ground where the viewer resides or is otherwise present when viewing the forecast.

Factors such as differences in temperature and pressure at ground level and at elevations above ground level often drastically effect the prevailing weather conditions for those locations. Accordingly, weather radar systems are limited in the amount of relevant information they can provide the average citizen. Thus, while it may not be prudent for an aircraft to travel through the weather system depicted on a viewer's television screen, in actuality, it may be perfectly calm on the ground below the weather system graphically depicted on that viewer's television screen.

What is needed therefore, but currently unavailable in the art, is a system and method for providing real-time weather information and forecasts relating to weather phenomenon and weather systems from the ground up. More specifically, there is a need for a system and method for distributing in situ observations from a plurality of remote locations so that video broadcast viewers and/or the remote locations can obtain ground level information pertaining to prevailing weather conditions at the remote locations. The ground level information obtained from remote sensing units may be displayed in a video broadcast or otherwise in conjunction with weather information obtained from radar, satellites, and/or other sources for geographic areas corresponding to the locations of the remote sensing units so that a substantially complete picture of the prevailing weather conditions for a given location within the geographic area can be conveyed to viewers in that geographic area. Such a system and method should be capable of substantially real-time delivery, reliable in operation, accurate, expandable with respect to area of coverage, easy to maintain, and inexpensive in operation. It is to the provision of such a system and method that the present invention is primarily directed.

SUMMARY OF INVENTION

One aspect of the present invention relates to a system for providing real-time site specific weather information. The system includes a plurality of remote sensing units, each of which incorporates an electronic messaging system for delivering electronic messages indicative of ground level meteorological observations, and a server system communicating with the remote sensing units to receive the electronic messages. The server system includes a database for storing information pertaining to the remote sensing units and instructions for routing the electronic messages. At least one remote system is configured to receive non-ground level meteorological data indicative of a weather phenomenon and to associate the electronic messages with the non-ground level meteorological data for graphical display together with a graphical view of the geographic area affected by the weather phenomenon and the ground level meteorological observations.

In another aspect, the present invention is directed to a method of providing real-time site specific weather information. The method includes the steps of receiving electronic messages indicative of ground level meteorological observations from a plurality of remote sensing units, and routing the received electronic messages to at least one remote system configured to receive non-ground level meteorological data indicative of a weather phenomenon. The received electronic messages are associated with the non-ground level meteorological data and geographical data to provide a graphical representation of the weather affecting a geographic area together with a graphical indication of the location of the remote sensing units.

The system and method for providing real-time site specific weather information of the present invention provides a number of advantages over other systems and methods currently known in the art. For example, the system and method of the present invention integrates traditional nonground level weather radar data or weather data from another source with surface observations made by sensing units remote from the weather radar system or other weather detection device. As a result, individuals viewing a video broadcast or other dissemination of this integrated weather information have a substantially complete picture of the weather events occurring at a specific geographic location, in real-time. Heretofore, the disseminated weather information that included only non-ground level weather radar information failed to provide any information about the events occurring beneath the reach of the radar systems employed to collect data relating to atmospheric conditions. As a result, many of the forecasts and predictions made by local weather providers appear incomplete, inaccurate and/or misleading.

In addition, the system and method for providing real-time site specific weather information of the present invention enables the users of the present invention to obtain multiple descriptions of weather phenomenon occurring at or near ground level for the same or multiple storms. This information is invaluable for verifying the accuracy of the various storm tracking/prediction systems currently employed in the art. The system and method of the present invention also provides accurate and timely warning of impending severe weather, giving those in harms way additional time to seek shelter.

Another advantage of the system and method of the present invention relates to events transpiring after a severe storm or other emergency event. Generally speaking, damage reports following a severe storm or other event are less than timely and generally sporadic. As a result, fire departments, ambulance crews, utility crews, and other emergency units often have difficulty responding where needed and on a timely basis. Because the system and method of the present invention operates in real-time, spotters can immediately notify remote systems with detailed damage reports, which can then be immediately disseminated to emergency crews and others so that they can timely provide assistance to those in need.

Yet another advantage of the system and method of the present invention relates to the remote system's ability to store an almost endless number of received electronic messages. The historical messages saved in memory may be reviewed and analyzed over time for verifying the accuracy of storm tracking/prediction algorithms, improving advanced weather warning systems, and in general, to gain a better understanding of what present graphical weather display systems really tell meteorologists about weather conditions occurring at ground level. Such review and analysis of historical data should lead to the development of new and better weather forecasting technologies.

These and additional features and advantages of the invention will be set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed. The accompanying drawings are included to provide further understanding of the invention, illustrate various embodiments of the invention, and together with the description serve to explain the principles and operation of the invention.

DETAILED DESCRIPTION OF THE PREFERRED EMBODIMENTS

Figure 1:
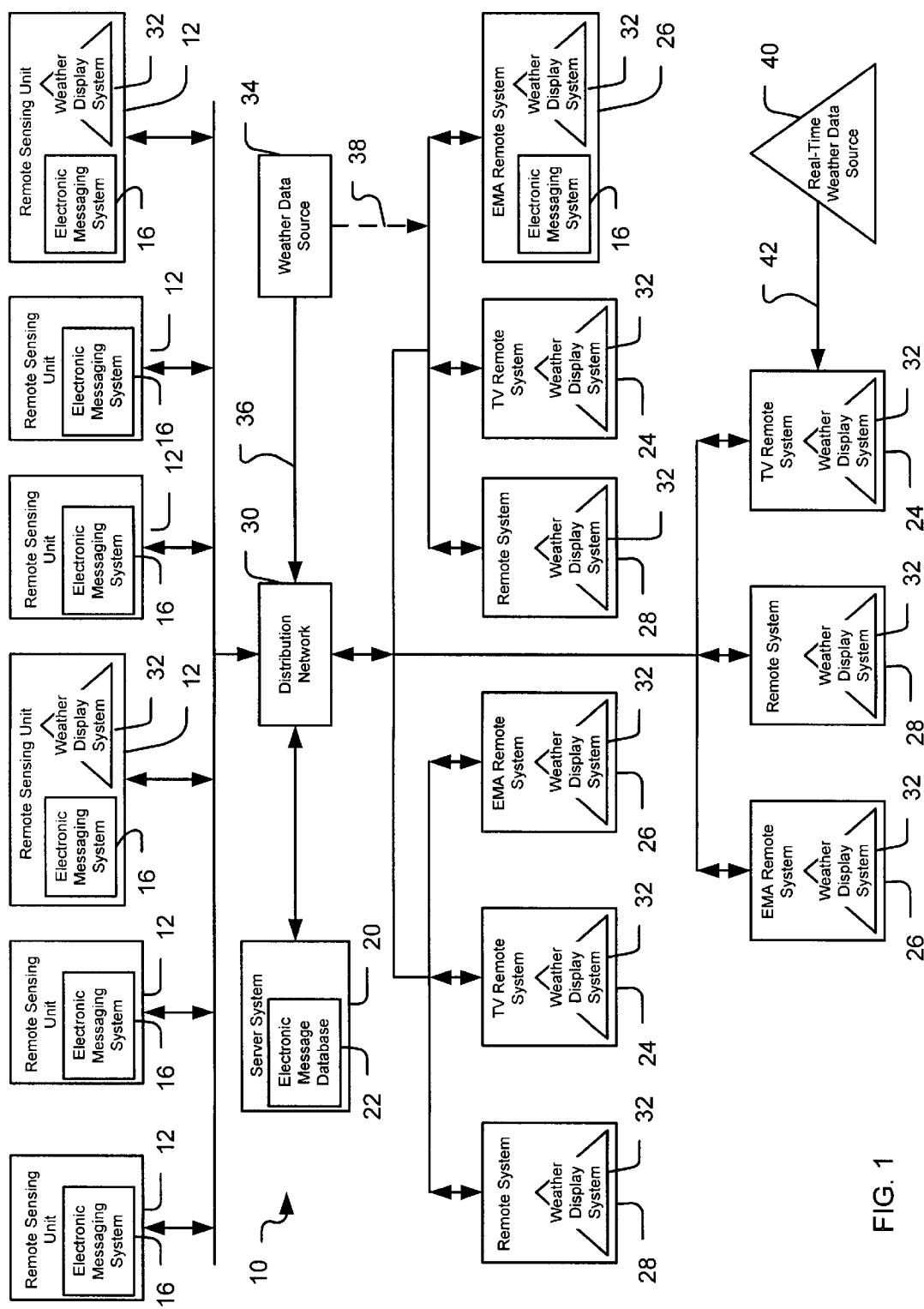
FIG. 1 is a block diagram illustrating a first preferred embodiment of the system of the present invention.

The present invention is generally directed to a system and method for integrating electronic messages pertaining to ground level meteorological observations made by remote sensing units or spotters with non-ground level meteorological data indicative of a weather phenomenon. The non-ground level meteorological data is preferably received from a source such as radar by remote systems having a weather display system that provides a graphical display of the weather phenomenon together with the geographic area affected by the weather phenomenon. When the ground level meteorological observations are processed and combined with the non-ground level IO meteorological data, the integrated graphical display provides a substantially complete graphical view of the geographic area affected by the weather phenomenon and the ground level meteorological observations.

Generally speaking, one or more remote systems are provided with weather display systems configured to receive electronic messages from sensing units or spotters positioned throughout the remote systems' geographic coverage area. The weather display system is connected to a distribution network such as the Internet and includes a database for storing a spotter's name, geographic location, and other user definable information pertaining to the identity of and capability of each remote spotter. The remote spotters are each connected to the distribution network via a standard home computer or other communication device via a dial-up connection or other link so that they can connect to the system on demand. When one of these spotters perceives a weather phenomenon or other condition affecting its location on the ground, the spotter may log onto the system, call up a compose message box, broadly define the type of weather phenomenon affecting its position, and insert a detailed message body that explains or describes the weather conditions occurring at ground level at its geographic location. The electronic message may then be instantly transmitted to a server system remote from the spotter and the remote systems where the message is routed to the one or more remote systems interested in receiving the message, and if desired, to the other remote units or spotters participating in the system. Spotters may also attach or otherwise affiliate digitized still image and/or video files and/or other information with the electronic message. Such information will also be transmitted to the server system where it can be processed and routed to the spotters, remote systems, and/or a website for viewing. The website may store the digitized still images, video clips, and other information so that spotters, remote systems, and if desired, anyone in the general public having access to the Internet or World Wide Web may view the stored information as desired.

When an electronic message is received by a remote system's weather display system, the weather display system (enhanced to effectively communicate with the spotters' electronic messaging systems) will be alerted that an electronic message has been received and is pending display. In a preferred embodiment, a user definable icon on the remote system's weather display will begin to blink, or in some other way change its appearance to indicate that a particular spotter has something to report. The blinking icon may then be selected on the weather display to determine what the message is and from whom the message is being sent. When the remote system user is a television broadcast meteorologist, the ground level weather data provided in the electronic message may be combined with the non-ground level weather data being received by the weather display system from radar or some other source to provide the viewing public with a substantially complete picture of the weather conditions affecting the geographic area occupied by the remote spotter.

In another embodiment of the present invention, the weather forecaster may note from the graphical display of non-ground level meteorological data that a non-ground level weather phenomenon is approaching or is over the position of a particular spotter who has not yet reported its ground level observations. In such a case, the meteorologist may select the icon appearing to be in harms way even though it is not blinking or otherwise indicating that the spotter has delivered an electronic message. When the icon is selected, a screen will appear that includes the identity of and telephone number for the spotter corresponding to the selected icon. The meteorologist may then manually place a telephone call to or otherwise contact the spotter to receive a real-time update of what that spotter is actually perceiving at ground level. The meteorologist may then manually direct that spotter's icon to blink or otherwise indicate to the viewing audience the geographical location of the spotter presently on the air. These and other embodiments of the present invention will be described in greater detail below with reference to the drawing figures.

Reference will now be made in detail to the present preferred embodiments of the invention, examples of which are illustrated in the accompanying drawing figures. Wherever possible, the same reference numerals will be used throughout the drawing figures to refer to the same or like parts. An exemplary embodiment of the system for providing real-time site specific weather information of the present invention is shown in FIG. 1, and is designated generally throughout by reference numeral 10.

In accordance with the invention, the present invention for providing substantially complete meteorological information for a specific location in real-time includes one or more remote sensing units or spotters, preferably television (TV) station sponsored remote sensing units 12 and Emergency Management Agency (EMA) sponsored remote sensing units 14, each equipped with electronic messaging systems 16 for creating, sending, and receiving electronic messages relating to observed ground-level meteorological conditions. Generally speaking, remote sensing units 12 and 14 will be "signed on" or sponsored by participating TV stations or EMAs, respectively, to participate in system 10 as remote sensing units. However, system 10 may include other remote units 18 that are individuals signed on to system 10 otherwise than by TV stations or EMAs. Examples of such remote sensing units 18 may be individuals interested in weather forecasting merely as a hobby, or individuals sponsored by, or whom are employed by a corporation or public entity, such as a utility company participating in system 10 as will be further described below.

System 10 of the present invention further includes a server system 20 having an electronic message database 22 compatible with the remote sensing units 12, 14 and 18 electronic messaging systems 16. Server system 20 is preferably a centrally located, Windows® 95, 98, 2000 or NT based, TCP/IP server system configured to receive and route electronic messages, as will be described in greater detail below. In addition, system 10 preferably includes a plurality of remote systems, such as, but not limited to, TV station remote systems 24, EMA remote systems 26, and/or other remote systems 28, such as public utility company remote system. Both the remote sensing units and remote systems preferably employ computer systems, personal digital assistants, and other consumer communication devices to access a distribution network 30, such as the Internet, through which the electronic messages are routed.

Remote systems 24, 26, and 28 each preferably include a weather display system 32 compatible with the remote sensing unit electronic messaging systems 16 and server system 20 electronic message database 22. Each of remote sensing units 12, 14 and 18, and remote systems 24, 26 and 28 communicates through server system 20 via network 30, such as, but not limited to, a local area network (LAN), an Ethernet, a wide area network (WAN), dial-up connections, and most preferably, network connections through the Internet.

As discussed briefly above, remote systems 24, 26 and 28 preferably receive weather data from a weather data source 34, such as NEXRAD weather data provided by the National Weather Service (NWS), which is typically provided through a third party weather service provider. Generally speaking, non-ground level meteorological and other weather data is provided by weather data source 34 via link 36 to distribution network 30, or alternatively, via a separate network connection 38. As an alternative, or in addition, remote systems 24, 26 and 28 may receive weather data from a substantially real-time weather data source 40, such as a real-time Doppler weather radar system owned or leased by a particular TV station, EMA, or other user of a remote system via direct connection 42. Although many weather display systems 32 known in the art may be configured to cooperate with and process messages from electronic messaging systems 16, preferred weather display systems are the FASTRAC® weather display system and RADAR-NET® weather display system, both of which are manufactured by Baron Services, Inc., headquartered in Huntsville, Alabama. The FASTRAC® system is disclosed in detail in U.S. Pat. No. 5,717,589, entitled, "System and Method Providing for Real-Time Weather Tracking and Storm Movement Prediction," issued on Feb. 10, 1998 to Thompson, et al., which is hereby incorporated by reference, herein, in its entirety. The RADAR-NET® system is disclosed in detail in U.S. Pat. No. 5,940,776, entitled, "Automated Real-Time Weather Graphics Generating System and Methods," issued on Aug. 17, 1999 to Baron, et al., which is hereby incorporated by reference, herein, in its entirety. The FASTRAC® system, or other system having FASTRAC® functionality, is a preferred weather display system 32 for use by TV remote systems 24 while a RADAR-NET® weather display system, or other system having RADAR-NET® functionality, is preferably employed in EMA remote systems 26. Depending upon the functionality desired, other remote systems 28 may employ either a FASTRAC® or RADAR-NET® system, or some other system known in the art, provided it is properly enhanced for compatibility with the remote sensing unit electronic messaging system 16 and server system 20.

Figure 3:
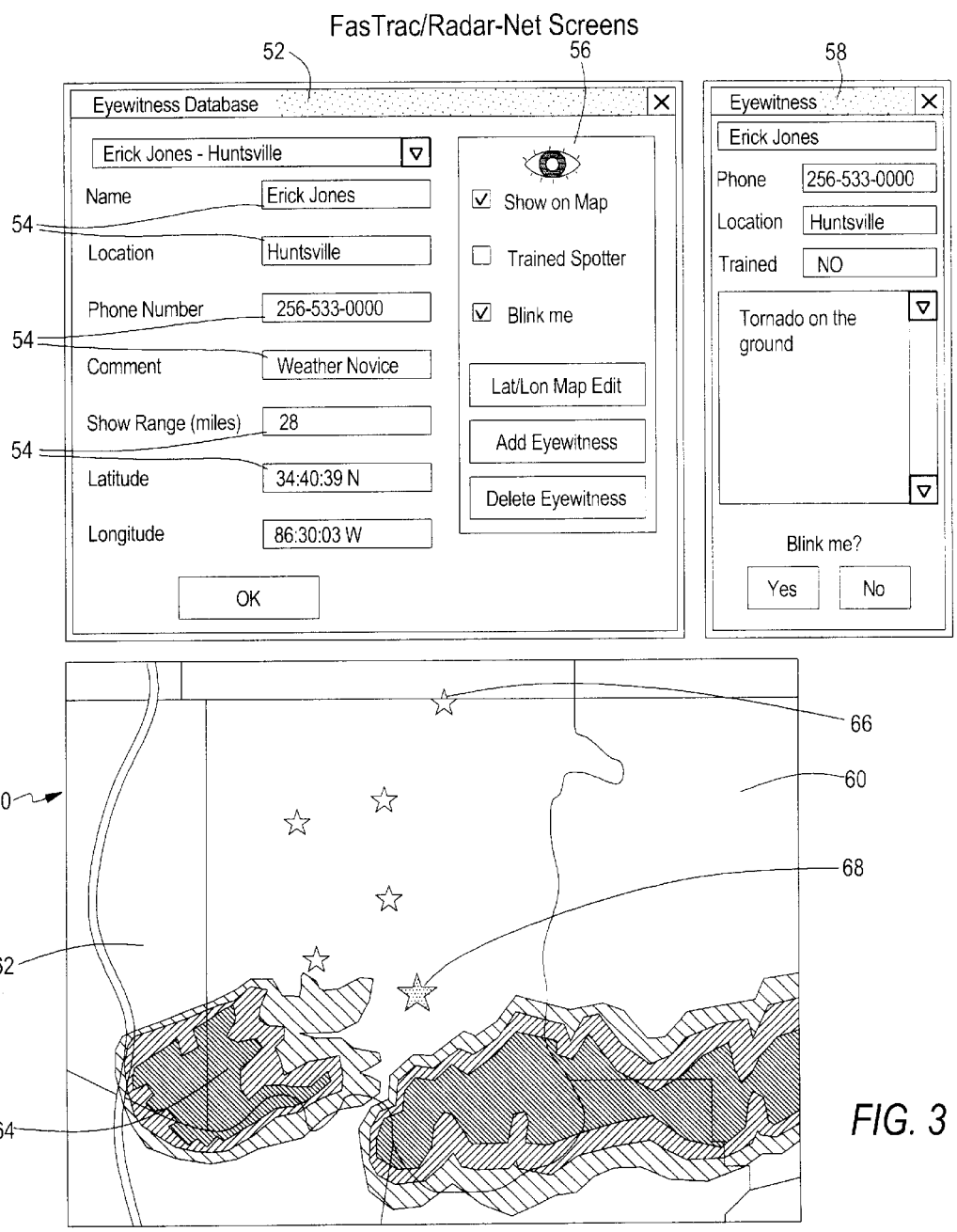
FIG. 3 depicts preferred embodiments of various enhanced weather display screens in accordance with the present invention.

In operation, weather display systems 32 of TV remote systems 24, EMA remote systems 26, and other remote systems 28 receive non-ground level meteorological data from weather data source 34 and/or real-time weather data source 40 and combine the non-ground level meteorological data with geographic data in order to create a graphical representation of the weather conditions for the geographic area of interest of each remote system 24, 26 and 28. The meteorological data is preferably radar data delivered via satellite, broad band, or standard land-line technology commonly known in the art. The weather data received from source 34 and/or source 40 may be radar data such as NEXRAD data, NEXRAD attributes, real-time Doppler weather radar data, or radar data in other formats typically known in the art. The locations of remote sensing units 12, 14 and/or 18 may be known to weather display systems 32 from information stored in memory or may be provided to weather display systems 32 via the electronic messages routed to weather display system 32 via server system 20. Accordingly, weather display systems 32 combine the data corresponding to the location of remote sensing units 12, 14 and/or 18 with the meteorological data and geographic data to depict the geographic location of each remote sensing unit 12, 14 and/or 18 on the graphical representation of weather conditions for the geographic area of interest. The location of remote sensing units 12, 14 and/or 18 can be depicted in a number of ways, but is preferably depicted as an icon, such as a star, raindrop, twister, or other visually appealing graphical representation, an example of which is illustrated in FIG. 3.

As meteorological events such as severe storms, dangerous conditions, and other significant events arise in the geographic vicinity of one or more of remote sensing units 12, 14 and/or 18, remote sensing units 12, 14 and/or 18 preferably deliver through server system 20, electronic messages that provide details of the event as perceived at ground level by the remote sensing units. Server system 20 preferably automatically receives and routes the electronic messages to remote systems 24, 26 and/or 28, and if desired to the other remote sensing units 12, 14 and/or 18 communicating with system 10. If desired system 10 can be configured to include a number of user definable filters for the delivery of electronic messages to only selected remote systems and/or remote sensing units. Although the preferred system and method of the present invention utilizes automatic delivery, it will be understood by those skilled in the art that system 10 may incorporate a "a man in the loop" such as a person or a computer program that filters and/or selectively distributes less than all of the delivered electronic messages.

As the electronic messages are distributed, weather display systems 32 utilized by remote system 24, 26 and 28 will preferably indicate that an electronic message has been received and is pending. Generally speaking, the icon on the weather display system 32 graphical display corresponding to the remote sensing unit that delivered the message will blink, change color, or otherwise indicate to a user of weather display system 32 that a message has been received and is pending. The icon indicating that a message is pending can then be selected via a computer mouse or other device to display the received message and view its contents. Preferably, but not always, the icon blinking or otherwise indicating that a message is pending will appear amidst the weather phenomenon or other meteorological event graphically depicted. In this way, remote systems 24, 26 and/or 28 can be informed of real-time weather conditions in the atmosphere via received nonground level meteorological data, and at the same time be informed of observed ground-level meteorological events beyond the reach of the radar or other systems providing the non-ground level meteorological data. Hence, what is generally known in the art as "ground truthing" can now occur in real-time.

As shown in FIG. 1, one or more of the remote system 24, 26 and/or 28 may also include an electronic messaging system 16 while one or more of remote sensing units 12, 14 and/or 18 may include a weather display system 32, both of which operate as discussed above. In this way, remote systems 24, 26 and/or 28 may also serve as remote sensing units, and remote sensing units 12, 14 and/or 18 may have the weather display capabilities typically associated with the remote systems.

Generally speaking, when remote sensing units 12, 14 and/or 18 are first incorporated into system 10 of the present invention, each remote sensing unit provides identifying information such as the spotter's name, location, and telephone number. This information together with a user ID, user name, and password are preferably stored in electronic message database 22 of server system 20. Additional information that enables the remote system 24, 26 and 28 to graphically depict the location of the remote sensing units, preferably the latitude and longitude of the remote sensing units, may also be stored in electronic message database 22 of server system 20. It will be understood by those skilled in the art, however, that the remote sensing units' 12, 14 and/or 18 electronic messaging systems 16 may be configured to automatically determine the geographic location of each remote sensing unit. Preferably, the remote sensing unit or spotter will enter its address, and electronic message system 16 will automatically seek out, via the Internet, a service provider that provides the latitude and longitude location corresponding to the spotter's address. The latitude and longitude information can then be transferred along with any remote sensing unit messages so that any users receiving messages will no longer need to know the spotter location in advance. While the preferred embodiment is described in terms of the remote sensing unit locations being described by latitude and longitude, it will be understood by those skilled in the art that the locations can be determined and described using other Cartesian coordinates.

Figure 2:
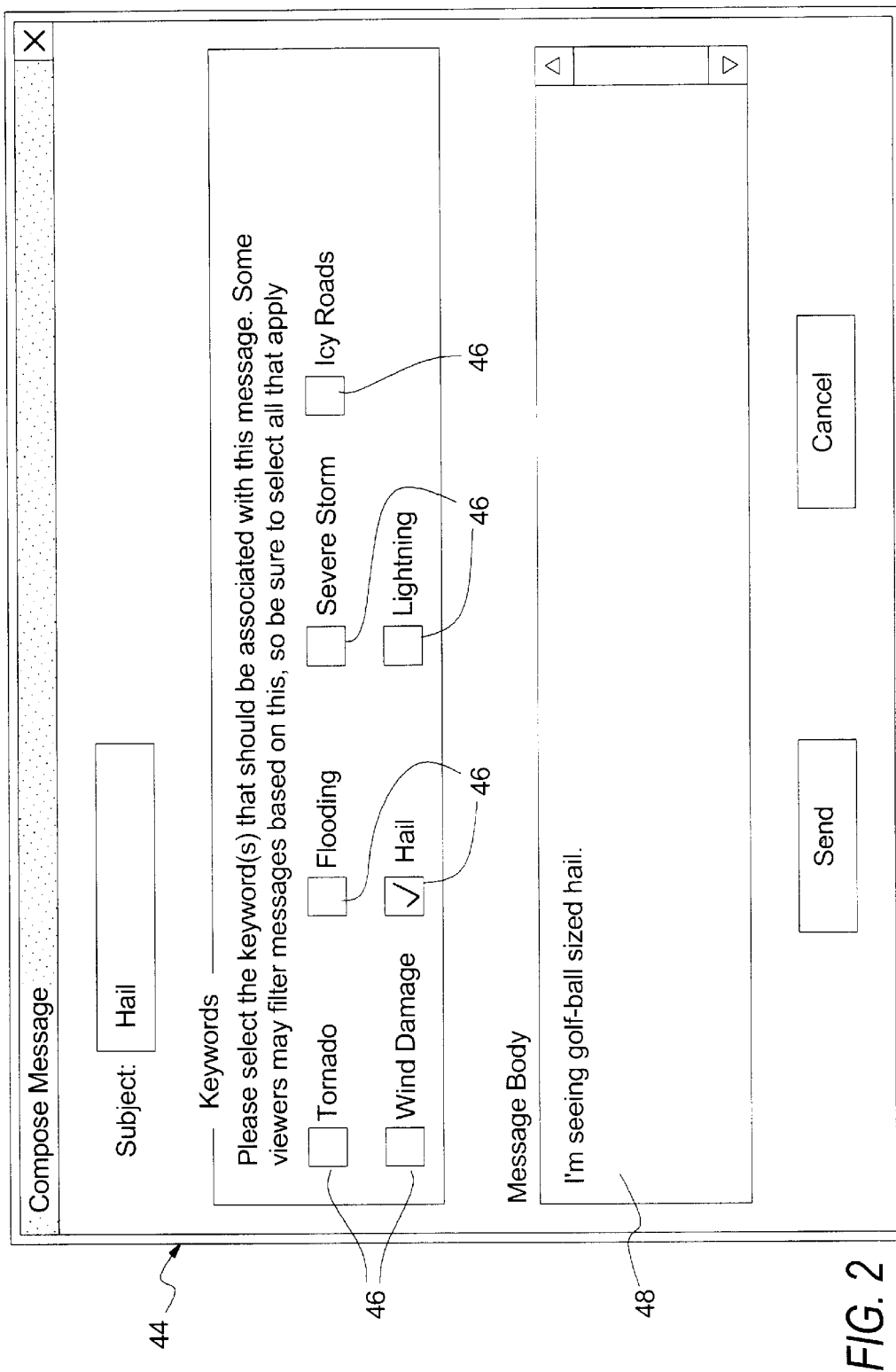
FIG. 2 is a screen display of a preferred compose message dialog box used in the delivery of electronic messages in accordance with the present invention.

When a spotter at remote sensing units 12, 14 and/or 18 observes ground-level meteorological events, the spotter simply logs onto system 10 using a user name and password via a dial-up connection or other connection to the Internet in substantially the same way one would if one were going to send an e-mail message or check to determine if an e-mail message had been delivered. As shown in FIG. 2, a spotter at remote sensing unit 12, 14 and/or 18 would then select a compose message icon which would result in the display of a compose message box such as compose message box 44 shown in FIG. 2. Compose message box 44 is preferably preconfigured to enable rapid selection of selected meteorological events 46 corresponding to the meteorological events observed occurring at ground-level by the spotter sending the message. In addition, compose message box 44 preferably includes a message field 48 for entering further details relating to the selected meteorological event and/or other matters of interest that may be of importance to those intended to receive the message. Although not shown in the drawing figure, still images files, video files, audio files and other information may be attached to or otherwise affiliated with the message for delivery to the server. Once completed, the message, and any affiliated files, can be sent by clicking the send button.

Figure 4:
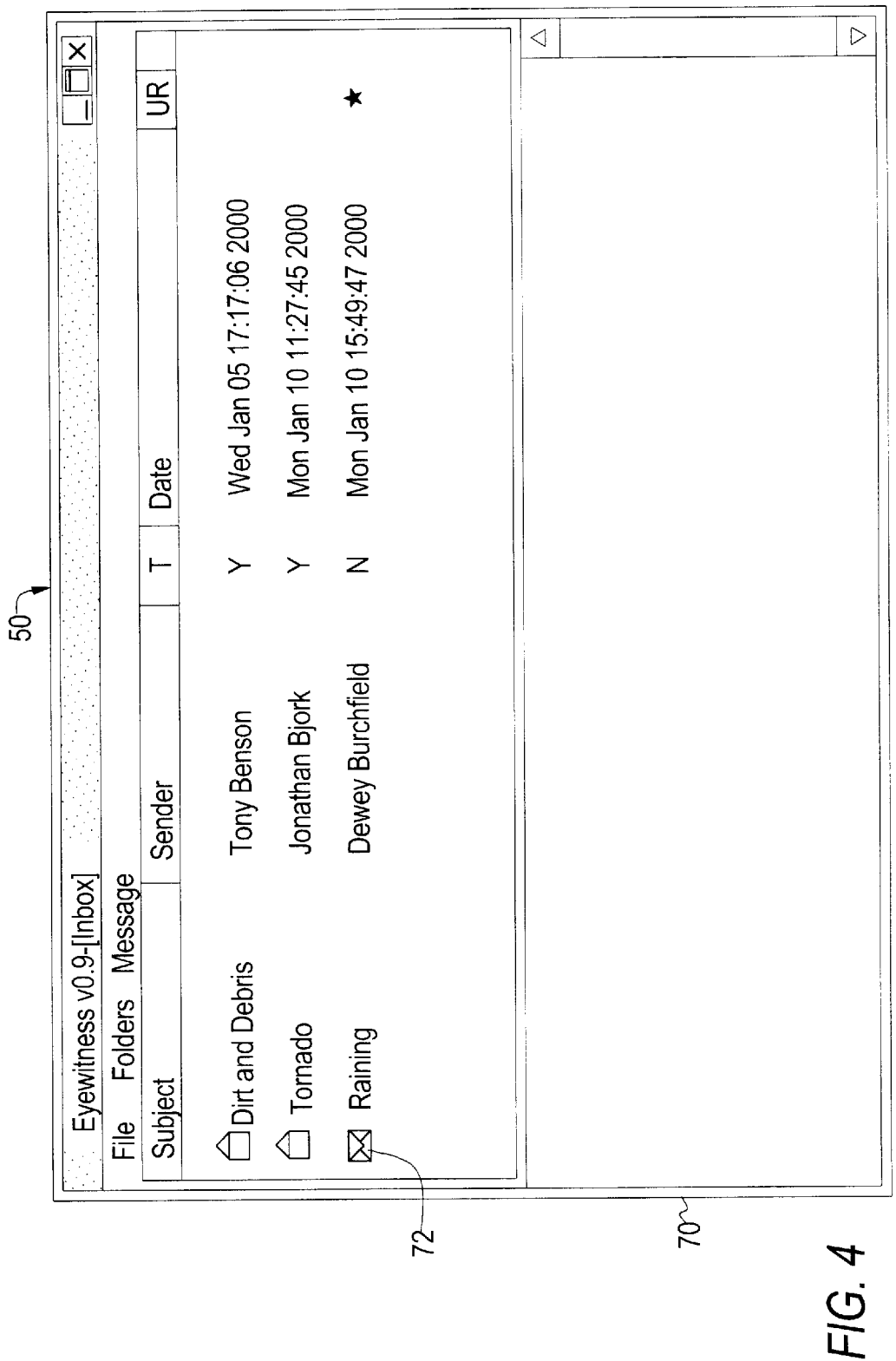
FIG. 4 is a screen display depicting a preferred embodiment of the received messages dialog box listing received messages in accordance with the present invention.
Figure 5:
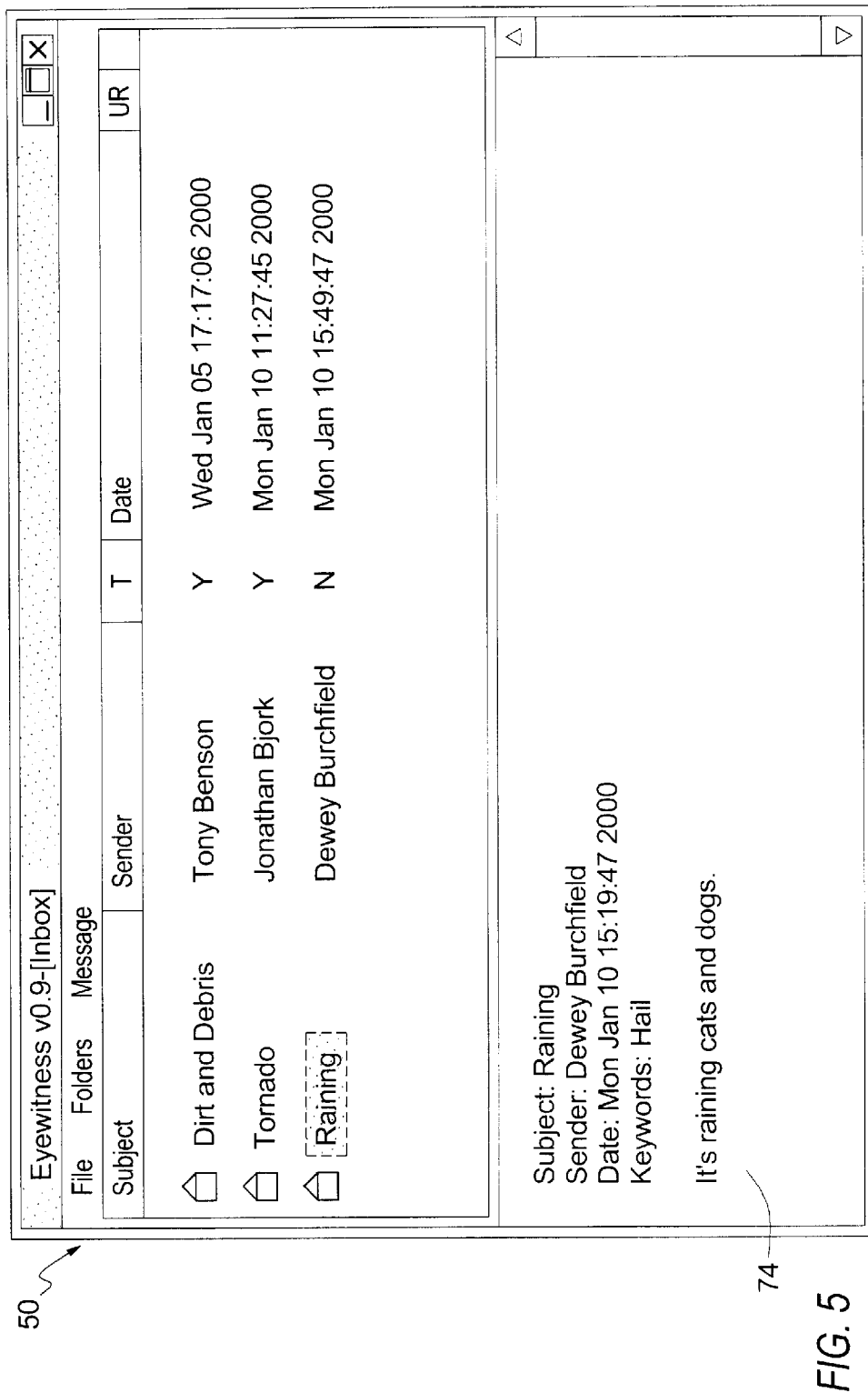
FIG. 5 shows the received message dialog box depicted in FIG. 4 after a user has selected and opened one of the listed messages.

FIGS. 3 through 5 depict the various display screens 50 available to remote system 24, 26 and 28 employing weather display system 32 enhanced to receive and process electronic messages from electronic messaging systems 16. A database address screen 52 (FIG. 3) may be called up by weather display system 32 to provide information relating to the sender of any received electronic messages. Database address screen 52 may readily be called-up to add, delete, and edit remote sensing unit information. Certain fields 54, such as the "comment" field and "show range" field are preferably user definable. Generally speaking, the show range field enables the remote systems to specify at what range an icon associated with the particular remote sensing unit sending the message will be displayed. Thus, when the display screen provided by weather display system 32 is fully zoomed-out, only a few icons may appear on the screen. When, however, the weather display screen is filly zoomed-in, several other icons may appear on the display. In this way, clutter on the weather display system 32 display screen can be kept to a minimum. Database address screen 52 further preferably includes a command section 56 that enables a user to provide various instructions to enhanced weather display system 32. For instance, the user of weather display system 32 may wish to show the remote sensing unit icon on the map, and blink the remote sensing unit icon when a message is received.

In a preferred embodiment, remote sensing units 12, 14 and/or 18 preferably include individuals serving as spotters at ground level. While remote sensing units 12, 14 and/or 18 preferably include individual spotters using electronic message system 16 similar to conventional e-mail systems, the present invention encompasses remotely activated electronic sensing systems employing computer assisted electronic message delivery systems, and other sensing devices commonly known in the art.

Message screen 58 is a preferred embodiment of the screen viewable at remote systems 24, 26 and 28 once an electronic message is received from one or more of the remote sensing units 12, 14 and/or 18. Message screen 58 preferably provides contact information such as a telephone number for the individual spotter sending the message, along with the message itself or a portion of that message. In addition, message screen 58 preferably includes a command box that enables a remote system user to manually activate the sensing unit message pending icon. This functionality is particularly useful when a remote sensing unit has not sent a message, but based upon the graphical representation of the non-ground level weather data, appears to be affected or will likely soon be affected by the weather phenomenon. In such instances, a weather display system 32 user may click on that icon even though it is not blinking or otherwise indicating that a message is pending. Message screen 58 will then appear with the spotters telephone number, but no message. The user may then call that spotter to receive a live ground level weather update from the spotter. If the user happens to be a TV station meteorologist, the user may want to click the "Blink me" command box button so that TV viewers will have a graphical indication of the location of the spotter providing the live update.

As shown in FIG. 3 graphical representation 60 includes a combination of geographic data for geographic area 62 combined with non-ground level meteorological data, here a severe storm 64, and a plurality of icons 66 indicating the location of remote sensing units 12, 14 and/or 18, one of which is a message received icon 68 indicated as blinking in a color different from that of the other icons depicted in FIG. 3. Generally speaking, when messages are sent by remote sensing units 12, 14 and/or 18 and routed by server system 20, system 10 alerts remote systems 24, 26 and 28 intended to receive the electronic messages that a message has been received. If the icons 66 are not already active on the graphical representation 60, the remote system receiving the message may activate the icons 66 and a dialogue box 70 (FIG. 4) containing a list of messages 72. A user at the remote system may then click on blinking icon 68 to call up the received message screen 58 to view the message as shown in FIG. 3 or alternatively, click on the received message from the list of messages 72 in dialogue box 70 to review the message content 74 as shown in FIG. 5.

Figure 6:
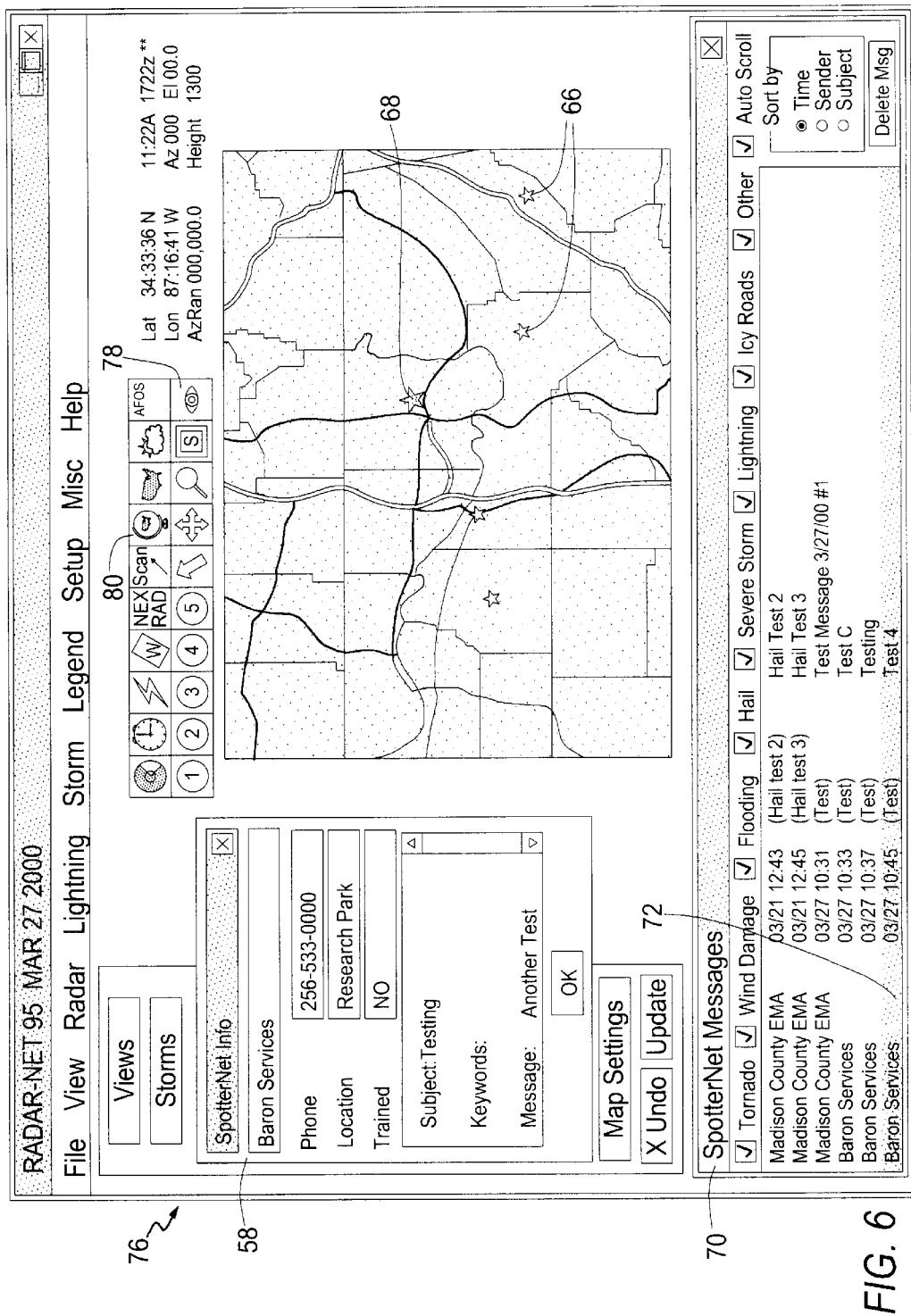
FIG. 6 depicts a screen display of a first preferred enhanced weather display system in accordance with the present invention.

FIG. 6 is included to depict a preferred method of displaying several of the features of the present invention together in a single screen as viewed primarily by remote systems 24, 26 and/or 28. Display screen 76 depicted in FIG. 6 is a RADAR-NET® display screen provided by a RADAR-NET® weather display system 32, enhanced as discussed above. In a preferred embodiment of the present invention, when an electronic message is received, enhanced weather display system 32 preferably indicates that a message has been received by causing the "eye" icon 78 in the hot button bar 80 to blink. When the weather display system 32 user selects the eye icon by clicking it with a mouse, for example, the plurality of spotter icons 66 are activated and appear on the display screen 76. Generally speaking, the icon corresponding to the remote sensing unit sending the message will blink, change colors, or otherwise indicate where the message originated from. Clicking the eye icon also preferably invokes the dialogue box 70 containing a list of received messages 72. By clicking the message received icon 68, an enhanced weather display system 32 user may invoke the message screen 58 which informs that user of the identity of the spotter sending the message and the actual contents of the message itself. Generally speaking, the contents of the message will relate to the observed ground-level meteorological conditions being perceived at the actual geographical location represented by the message received icon 68. Alternatively, the system user may click on any one of the messages contained in the list of messages 72 in dialogue box 70. Doing so will provide the message contents 74 as depicted in FIG. 5. One of skill in the art will recognize that dialog box 70 includes a listing of weather events that can be selected or deselected as desired. In a preferred embodiment, only messages relating to the selected events will be received. This is but one of the filtering aspects provided by the present invention.

Figure 7:
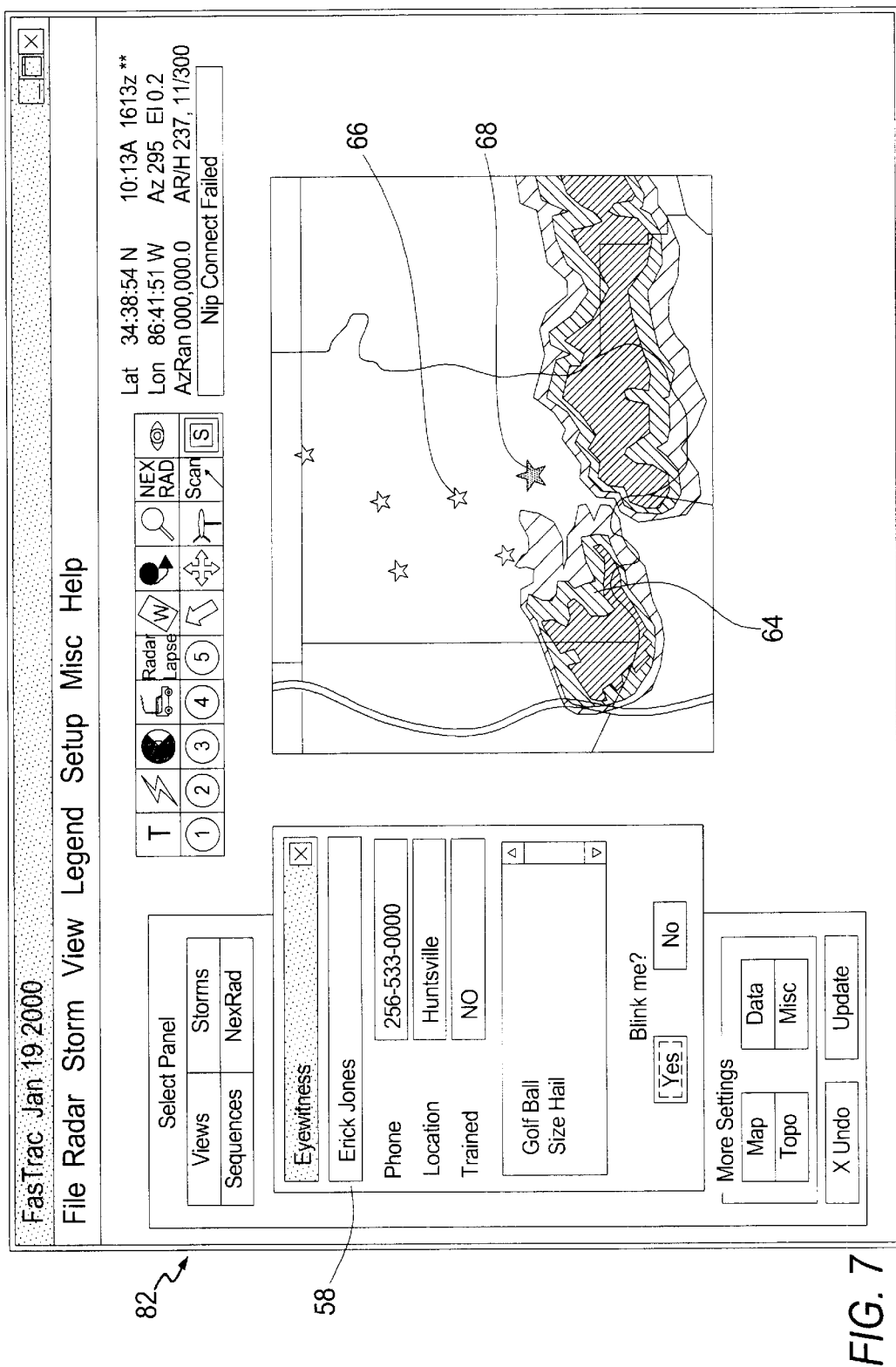
FIG. 7 depicts a screen display of a second preferred enhanced weather display system in accordance with the present invention.

FIG. 7 is included to depict a second preferred method of displaying several of the features of the present invention together in a single screen as viewed primarily by remote systems 24, 26 and/or 28. Display screen 82 depicted in FIG. 7 is a FASTRAC® display screen provided by a FASTRAC® weather display system 32 enhanced as described above. Display screen 82 is similar to display screen 76 depicted in FIG. 6, but includes processed non-ground level meteorological data depicted as severe storm 64 shown superimposed over spotter icon 66. Display screen 82 further depicts message screen 58 indicating that the user of the system producing the display 82 depicted in FIG. 7 has selected the blinking message received icon 68 to receive the electronic message. As a result, the user now knows that the spotter represented by blinking message received icon 68 (in this case Erick Jones) is seeing "golf ball sized hail" on the ground where he is located geographically (at the latitude and longitude represented by blinking message received icon 68). Although not shown in the drawing figure, one skilled in the art will recognize that a preferred embodiment of display screen 82 will also include a received message dialog box similar to received message dialog box 70 depicted in FIG. 6.

While the non-ground level graphical depiction of severe storm 64 alone would not identify the area occupied by blinking message received icon 68 as an area being affected by hail at ground level, a user now knows that that area is in fact being affected by hail. As a result, if the user is a weather forecaster, he can now provide relevant information to the viewing public.

It will be apparent to those skilled in the art that various modifications and variations can be made to the present invention without departing from the spirit and scope of the invention. For instance, the system of the present invention may be modified to permit remote systems 24, 26 and 28 to deliver requests for additional information through server system 18 to the remote sensing units that delivered the original electronic messages. In addition, the system and method of the present invention can be expanded to incorporate a plurality of geographic areas. Such a system and method can encompass an extremely large geographic area such as the entire United States. As a result, selected delivery of the electronic messages and other filtering techniques are important features of the present invention. Moreover, remote sensing units 12, 14 and 18 may include roaming spotters such as mobile storm chasers having a global positioning system (GPS) or other device to substantially continuously determine their ever changing positions. The roaming spotter's position would be delivered with any messages or otherwise conveyed to the remote system so that the remote system's graphical displays could be updated to accurately reflect the location of the roaming spotters. Additionally, the weather display systems 32 may be further enhanced to produce icons that correspond in shape and appearance to the type of ground level meteorological events observed. For example, if one spotter is observing a tornado, and he reports that observation, the icon corresponding to that spotter may appear as a twister on the display screen. Similarly, another spotter may report lightning, thus that spotter's icon may appear as a lightning bolt. If a spotter is reporting multiple weather phenomenon, the system may display the icon indicative of the most severe event, or alternate between icons representative of all events reported. Thus it is intended that the present invention cover the modifications and variations of this invention provided they come within the scope of the appended claims and their equivalents.

What is claimed is:

1. A system for providing real-time site specific weather information, said system comprising:

a plurality of remote sensing units, each of said remote sensing units including an electronic messaging system for delivering electronic messages indicative of ground level meteorological observations;

a server system communicating with said remote sensing units to receive the electronic messages, said server system including a database for storing information pertaining to said remote sensing units and instructions for routing the received electronic messages; and at least one remote system configured to receive non-ground level meteorological data indicative of a weather phenomenon and to associate the electronic messages with the non-ground level meteorological data for graphical display together with a graphical view of the geographic area affected by the weather phenomenon and the ground level meteorological observations.

2. The system of claim 1 wherein said at least one remote system comprises a plurality of remote systems.

3. The system of claim 2 further comprising a filter for limiting the routing of the electronic messages to less than all of the remote systems.

4. The system of claim 1 further comprising a display device communicating with said at least one remote system to display the geographical location of said plurality of remote sensing units together with the graphical view of the geographic area affected by the weather phenomenon.

5. The system of claim 1 further comprising means for displaying the geographical location of said plurality of remote sensing units.

6. The system of claim 5 wherein said means for displaying the geographical location of said plurality of remote sensing units is user definable.

7. A method of providing real-time site specific weather information, said method comprising the steps of:

receiving electronic messages indicative of ground level meteorological observations from a plurality of remote sensing units;

routing said received electronic messages to at least one remote system configured to receive non-ground level meteorological data indicative of a weather phenomenon; and associating said received electronic messages with the non-ground level meteorological data and geographical data to provide a graphical representation of the weather affecting a geographic area together with a graphical indication of the location of the remote units.

8. The method of claim 7 wherein said at least one remote system comprises a plurality of remote systems, and wherein said routing step comprises the step of delivering said received electronic messages to less than all of said plurality of remote systems.

9. The method of claim 7 further comprising the step of displaying a graphical representation of the weather affecting a geographic area together with a graphical indication of the location of the remote units.

10. The method of claim 9 further comprising the step of graphically indicating that an electronic message has been received.

11. The method of claim 8 wherein said routing step further comprises the step of selectively distributing said received electronic messages based upon the type of ground level meteorological observations made.

* * * * *